(12) United States Patent
Westrelin et al.

(10) Patent No.: US 10,324,741 B2
(45) Date of Patent: Jun. 18, 2019

(54) SPEEDING UP DYNAMIC LANGUAGE EXECUTION ON A VIRTUAL MACHINE WITH TYPE SPECULATION

(71) Applicant: Oracle International Corporation, Redwood Shores, CA (US)

(72) Inventors: Roland Westrelin, Grenoble (FR); John Robert Rose, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 483 days.

(21) Appl. No.: 14/699,141

(22) Filed: Apr. 29, 2015

(65) Prior Publication Data

US 2016/0062878 A1 Mar. 3, 2016

Related U.S. Application Data

(60) Provisional application No. 62/044,201, filed on Aug. 30, 2014.

(51) Int. Cl.
*G06F 8/41* (2018.01)
*G06F 11/34* (2006.01)
*G06F 9/455* (2018.01)

(52) U.S. Cl.
CPC ............ *G06F 9/4552* (2013.01); *G06F 8/437* (2013.01); *G06F 11/3409* (2013.01); *G06F 11/3466* (2013.01); *G06F 2201/865* (2013.01)

(58) Field of Classification Search
CPC .... G06F 9/4552; G06F 9/45525; G06F 8/437; G06F 11/3409; G06F 11/3466; G06F 2201/865
See application file for complete search history.

(56) References Cited

U.S. PATENT DOCUMENTS

| 5,940,621 A * | 8/1999 | Caldwell ................. G06F 8/437 717/147 |
| 7,493,610 B1 * | 2/2009 | Onodera ................... G06F 8/49 714/38.14 |

(Continued)

OTHER PUBLICATIONS

Jin Lin et al., "A compiler framework for speculative analysis and optimizations," 2003, [retrieved on Dec. 6, 2018], Proceedings of the ACM SIGPLAN 2003 conference on Programming language design and implementation, pp. 289-299, downloaded from <url>:https://dl.acm.org/citation.cfm?id=781164. (Year: 2003).*

(Continued)

*Primary Examiner* — Thuy Dao
*Assistant Examiner* — Stephen D Berman
(74) *Attorney, Agent, or Firm* — Hickman Palermo Becker Bingham LLP

(57) ABSTRACT

According to one technique, a virtual machine stores type profiling data for program code, the type profiling data indicating observed types for profiled values within the program code at specific profile points during previous executions of the program code. The virtual machine determines to optimize a particular code segment of the program code. The virtual machine generates a program representation describing a flow of data through different variables within the code segment. The virtual machine assigns speculative types to certain variables in the particular code segment by: assigning speculative types of first variables to respective observed types recorded in the type profiling data; calculating speculative types of second variables, based on propagating the speculative types of the first variables through the program representation. The virtual machine compiles the particular code segment by optimizing instructions within the particular code segment based speculative types of variables utilized by the instructions.

26 Claims, 6 Drawing Sheets

(56) References Cited

U.S. PATENT DOCUMENTS

| | | | | |
|---|---|---|---|---|
| 7,533,246 B2* | 5/2009 | Taylor | | G06F 8/447 |
| | | | | 712/200 |
| 8,561,040 B2* | 10/2013 | Rose | | G06F 9/45516 |
| | | | | 717/148 |
| 8,959,495 B2 | 2/2015 | Chafi et al. | | |
| 9,038,041 B2* | 5/2015 | Salz | | G06F 8/41 |
| | | | | 717/107 |
| 9,239,706 B2 | 1/2016 | Stoodley et al. | | |
| 9,250,865 B2 | 2/2016 | Stoodley et al. | | |
| 9,690,709 B2 | 6/2017 | Sandoz et al. | | |
| 2008/0134158 A1* | 6/2008 | Salz | | G06F 8/34 |
| | | | | 717/148 |
| 2010/0235819 A1* | 9/2010 | Rose | | G06F 9/45516 |
| | | | | 717/139 |
| 2012/0005660 A1* | 1/2012 | Goetz | | G06F 8/437 |
| | | | | 717/140 |
| 2013/0055063 A1* | 2/2013 | Mondal | | G06F 9/4552 |
| | | | | 715/234 |
| 2013/0227388 A1* | 8/2013 | Trunley | | G06F 9/45516 |
| | | | | 715/234 |
| 2013/0305230 A1* | 11/2013 | Inoue | | G06F 8/443 |
| | | | | 717/153 |
| 2014/0047416 A1* | 2/2014 | Pizlo | | G06F 8/443 |
| | | | | 717/128 |
| 2014/0047423 A1* | 2/2014 | Pizlo | | G06F 8/443 |
| | | | | 717/153 |
| 2014/0282449 A1* | 9/2014 | Adl-Tabatabai | | G06F 9/4552 |
| | | | | 717/148 |
| 2014/0325493 A1* | 10/2014 | Stoodley | | G06F 9/4552 |
| | | | | 717/148 |
| 2015/0007151 A1* | 1/2015 | Wuerthinger | | G06F 9/4552 |
| | | | | 717/144 |
| 2015/0261646 A1* | 9/2015 | Chowdhury | | G06F 11/3409 |
| | | | | 717/130 |
| 2015/0331681 A1 | 11/2015 | Rose et al. | | |
| 2016/0019071 A1* | 1/2016 | Webb | | G06F 9/4436 |
| | | | | 719/331 |

OTHER PUBLICATIONS

Tong Chen et al., "Data Dependence Profiling for Speculative Optimizations," 2004, [retrieved on Dec. 6, 2018], International Conference on Compiler Construction, Compiler Construction, pp. 57-72, downloaded from <url>:https://link.springer.com/chapter/10.1007/978-3-540-24723-4_5. (Year: 2004).*

Chris Lattner et al., "LLVM: A Compilation Framework for Lifelong Program Analysis & Transformation," 2004 [retrieved Dec. 6, 2018], proceedings of the international symposium on Code generation and optimization: feedback-directed and runtime optimization, p. 75, downloaded at <url>: https://dl.acm.org. (Year: 2004).*

* cited by examiner

SPEEDING UP DYNAMIC LANGUAGE EXECUTION ON A VIRTUAL MACHINE WITH TYPE SPECULATION

PRIORITY CLAIMS; RELATED APPLICATIONS

This application is a non-provisional of U.S. Patent Application No. 62/044,201, filed Aug. 30, 2014, entitled "Speeding Up Dynamic Language Execution On a Virtual Machine with Type Speculation", the entire contents of which is incorporated for all purposes as though fully stated herein.

TECHNICAL FIELD

Embodiments relate generally to techniques for optimizing execution of program code on computing devices.

BACKGROUND

In computing an optimizing compiler is a compiler that tries to minimize or maximize some attributes of an executable computer program, such as by increasing run-time performance, decreasing the amount of memory utilized by the program, and so forth. Compiler optimization is often implemented using a sequence of optimizing transformations, algorithms that take a program and transform it to produce a semantically equivalent output program that uses fewer resources or executes more quickly. Compiler optimizations can be divided into multiple categories, such as loop optimizations, data-flow optimizations, SSA-based optimizations, code generator optimizations, bounds-checking eliminations, dead code limitations, and so forth. However, by some considered the most important form of optimization, is inlining. Inlining is performed by replacing method invocations with the substance of the called method. As a result, the transformed code requires less overhead, such as including fewer jump instructions. Furthermore, inlining can help fuel other optimizations by providing the compiler with larger chunks of code to analyze. However, for method calls which are potentially polymorphic, it can be difficult for the compiler to determine which implementation of an overridden method to inline.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
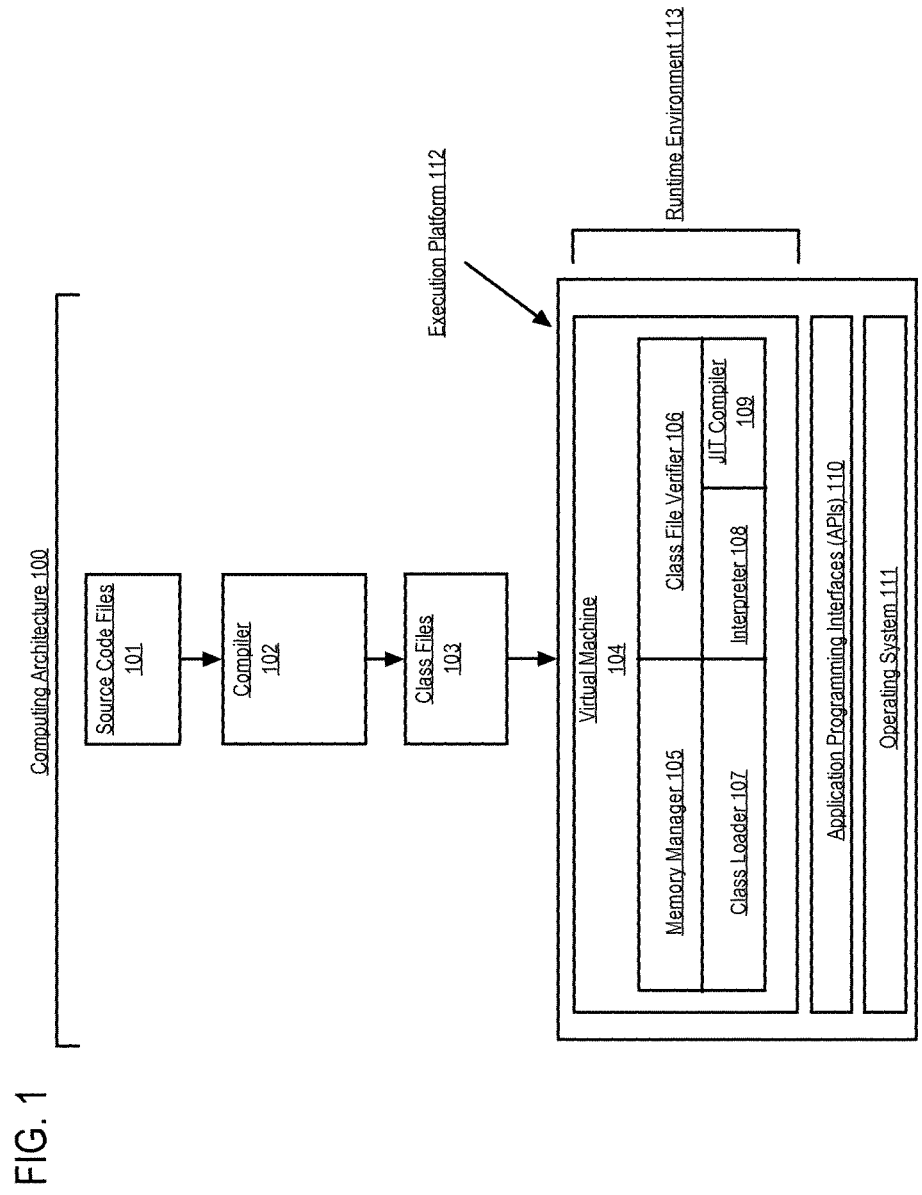
FIG. 1 illustrates an example computing architecture in which techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Architecture
    2.1 Example Class File Structure
    2.2 Example Virtual Machine Architecture
    2.3 Loading, Linking, and Initializing
3.0 JIT Compiler Issues
    3.1 HotSpot Detection
    3.2 Method Inlining
    3.3 Dynamic Deoptimization
    3.4 Example Client Compiler
    3.5 Example Server Compiler
    3.6 Example Compiler Optimizations
    3.7 Example JIT Compiler Techniques
    3.8 Tiered Compilation
    3.9 Asynchronous vs. Synchronous Compilation
4.0 Example Profiling Techniques
    4.1 Example Profile Data Structure
    4.2 Example Type Profile
    4.3 Type Profile Structure
    4.4 Profile Pollution
    4.5 Failure Modes
    4.6 Data Type Flow Structures
    4.7 Example Virtual Machine Type System
5.0 Type Speculation
    5.1 Example Speculative Profiling Details
    5.2 Example Uses Of Speculative Type Information—Inlining
    5.3 Example Uses Of Speculative Type Information—Optimizing Type Checks
    5.4 Example Uses Of Speculative Type Information—Cutting Unused Branches
6.0 Hardware Overview
7.0 Extensions and Alternatives
8.0 Additional Disclosure 1.0. General Overview Techniques are described herein for improved optimization of profiled program code using speculative type information for values within the code. The techniques described herein often use terms and definitions from the Java programming language, the Java Virtual Machine ("JVM"), and the Java Runtime Environment. It is contemplated, however, that the described techniques may be used in conjunction with any programming language, virtual machine architecture, or run-time environment. Thus, for example, terminology described in Java terms, such as "methods", are interchangeable with other terminology, such as "functions". Furthermore, the term "method" is also synonymous with the terms "class method" or "object method". A method is a set of code which is referred to by name and can be called (invoked) at various points in a program, which causes the method's code to be executed.

In general, programs are either compiled or interpreted. When a program is compiled, the code is transformed globally from a first language to a second language before the program is executed. For example, the first language may be a high level language designed to be readable to a human programmer and the second language may be a machine-level language representing the instruction set supported by the underlying hardware. As another example, the first language may be an intermediate code representation, such as bytecode, and the second language may be machine-level code. When a program is interpreted, the code of the program is read instruction-by-instruction and converted to machine-level instructions while the program is executing. For example, each instruction in the first language can be mapped to respective one or more instructions in the second language that, when executed, causes the original instruction's intended effect. Thus, compiling performs the transformation up front, while interpreting performs the transformation on an as-needed basis. However, certain types of compilers, such as Just-in-Time compilers, blur the line between interpreting and compiling by performing the compilation in chunks, such as compiling each method just before execution.

During compilation, the work of transforming the code is performed ahead of time. As a result, compiled code tends to have superior run-time performance compared to interpreted code. In addition, since the transformation occurs globally before execution, the code can be analyzed and optimized using techniques such as constant folding, dead code elimination, inlining, and so forth, that might otherwise not be possible when considering the program only one instruction at a time. However, as a consequence to performing the transformation up front, the startup time can be significant. In addition, inserting new code would require the program to be taken offline, re-compiled, and re-executed. For many dynamic languages (such as Java) which are designed to allow new code to be inserted during the program's execution, a purely compiled approach is insufficient.

Since interpreting a program performs the transformation as the program is running, interpreted programs can begin executing almost immediately with little to no start-up time. However, the run-time performance of interpreted programs is diminished by performing the transformation on the fly. Furthermore, since each instruction is analyzed individually, many optimizations that rely on a more global analysis of the program cannot be performed. For example, constant folding may take the following instructions "i=2; i=i+1" and produce instead a single instruction in the second language to store "i=3". However, in order to recognize that this optimization is possible, more than one instruction needs to be analyzed.

In some cases, a balance between interpreting and compiling can be reached by implementing aspects of both techniques. In an embodiment, a virtual machine initially interprets the code, but keeps track of usage statistics for certain instructions referred to as "profiling points". Using JVM bytecode as an example, the virtual machine could associate a data structure with the invoke bytecode instructions that keep track of the number of times the invocation is executed. When the number of invocations on a particular method exceeds a threshold, the virtual machine compiles the block of code representing the method to produce optimized machine-level code. The compiled code is then executed whenever that instruction would be called during the run-time of the program. As a result, the virtual machine takes advantage of the fast start-up time of interpreting, while optimizing the "hot" code segments that are executed frequently. Since most programs spend a vast majority of their run-time executing a small amount of its overall code, once the program has "warmed up" by executing for some time, the run-time performance can rival that of full compilation.

However, in some cases, keeping track of only the number of times a particular code segment is executed is insufficient for certain types of optimizations. For example, inlining is an optimization that replaces method calls by substituting the call with the body of the called method. As a result, the virtual machine is able to omit jump instructions, which tend to be fairly costly. Furthermore, inlining can be performed recursively ("deep inlining"), thus if Method A calls Method B which in turn calls Method C, the contents of both Method B and Method C can be inlined into Method A. However, when a method invocation is potentially polymorphic, such as the JVM invokevirtual instruction, the virtual machine may not know for sure which implementation of the method will be called during run-time and thus should be inlined.

For example, consider an abstract class Feline which has a sub-class HouseCat and another sub-class Lion. HouseCat implements the method speak, by printing "meow" and Lion implements the method speak by printing "roar". If an array is declared to hold Feline objects and is iterated through with speak being called on each object, the implementation of speak called by the invokevirtual instruction will differ depending on whether the object is a Lion or a HouseCat. As a result, the invokevirtual instruction ordinarily could not be inlined since the virtual machine would not know which implementation to bring upward into the caller. Thus, in some embodiments, the virtual machine stores in the structure associated with the invokevirtual instruction metadata indicating the type of the receiver (e.g. the type of the object the method is called on). Thus, if the metadata indicates that the invokevirtual instruction has only been called on objects of type Lion, the virtual machine can inline that implementation and inject "guard code" that checks whether the type of the object is indeed Lion. If so, the inlined method code can be executed, otherwise the unoptimized invokevirtual instruction is reinstated.

Storing type information at various profiling points in the program, such as invokevirtual instructions, can be helpful to enable inlining and other optimizations. However, there are still scenarios where the virtual machine may become unable to determine which method implementation should be inlined. One such scenario is when a method is called from many different callers, each of which passes different types of parameters to the called method. For example, assume Method C takes a parameter object of type Feline and invokes the speak method of that object. Method C is called by both Method A and Method B, where Method A passes a parameter of type HouseCat to Method C and Method B passes a parameter of type Lion to Method C. In this situation, if the virtual machine attempted to perform a deep inlining of Method C into Method A, the type information for the speak invocation in Method C would indicate that both type Lion and type HouseCat have been seen as the receiver at that point in the program (assuming both Method A and Method B have been executed at least once). As a result, the virtual machine would be unable to resolve which implementation of speak to inline into Method C and ultimately into Method A.

To resolve such issues, embodiments also keep track of the types of the parameters of an invocation, in addition to the receiver of the invocation. Thus, continuing the example, the virtual machine stores metadata for the invocation from Method A to Method C that indicates the type of the passed parameter is HouseCat. As a result, rather than optimizing based on the assumption the parameter is of declared type Feline and being unable to resolve the receiver due to the polluted profile, the information related to the type of the passed parameter allows the virtual machine to determine that, when called from Method A, the receiver of the speak invocation is the more specific type HouseCat. Thus, type information flows from caller to callee based on profiling the parameter types of the invocation. Once the more specific type has been resolved, the virtual machine now knows which implementation of speak to inline during the compiling and optimization process.

In some embodiments, in addition to tracking the types of parameters to invocations, the virtual machine also keeps track of the return types of invocations as well. Thus, in addition to type information flowing from caller to callee via parameters, the type information can flow upstream as well, from callee to caller, by tracking the return types. As a result, the virtual machine can model the code to be optimized using a program representation, such as a control flow graph (CFG), which can be iterated over to determine potential types at virtually any instruction in the modeled code. In addition to inlining, the extended type information can be used to fuel other optimizations as well, such as dead code elimination, type check optimization, loop unrolling, and so forth.

2.0 Example Operating Architecture

FIG. 1 illustrates an example computing architecture 100 in which techniques described herein may be practiced.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach is generally inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most of their time executing a small portion of their overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling, which will be described in later sections.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion will assume that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
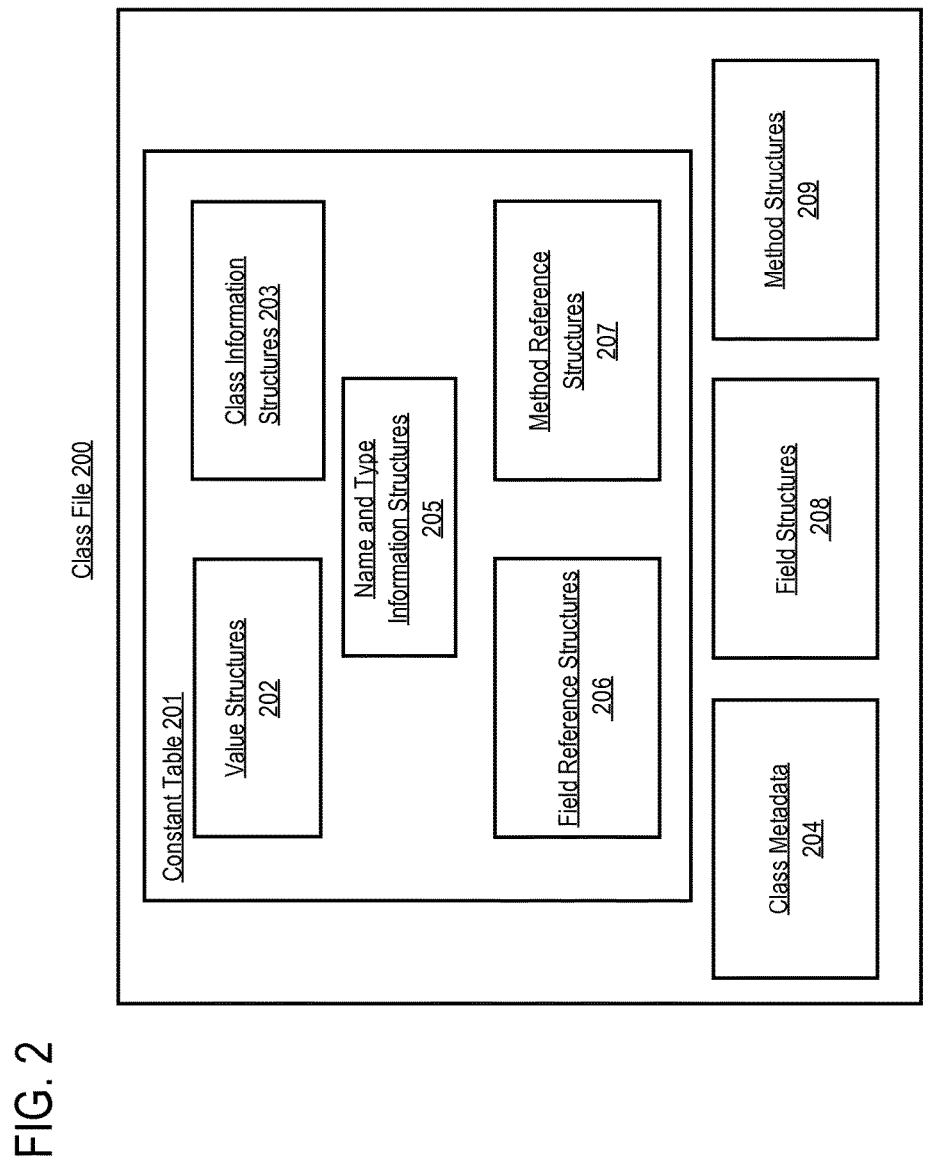
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201.

Using Java as an example, consider the following class

```
class A
{
int add12and13( ) {
  return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
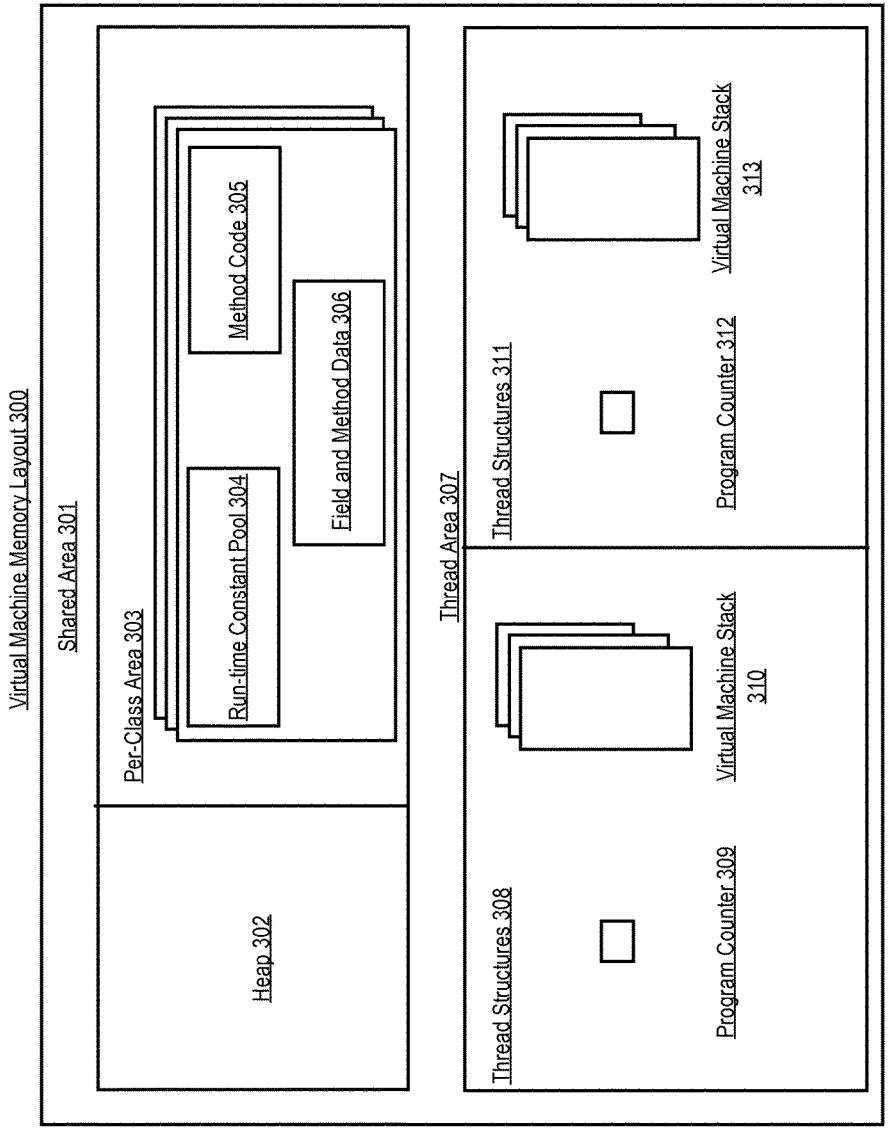
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307.

The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads. Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
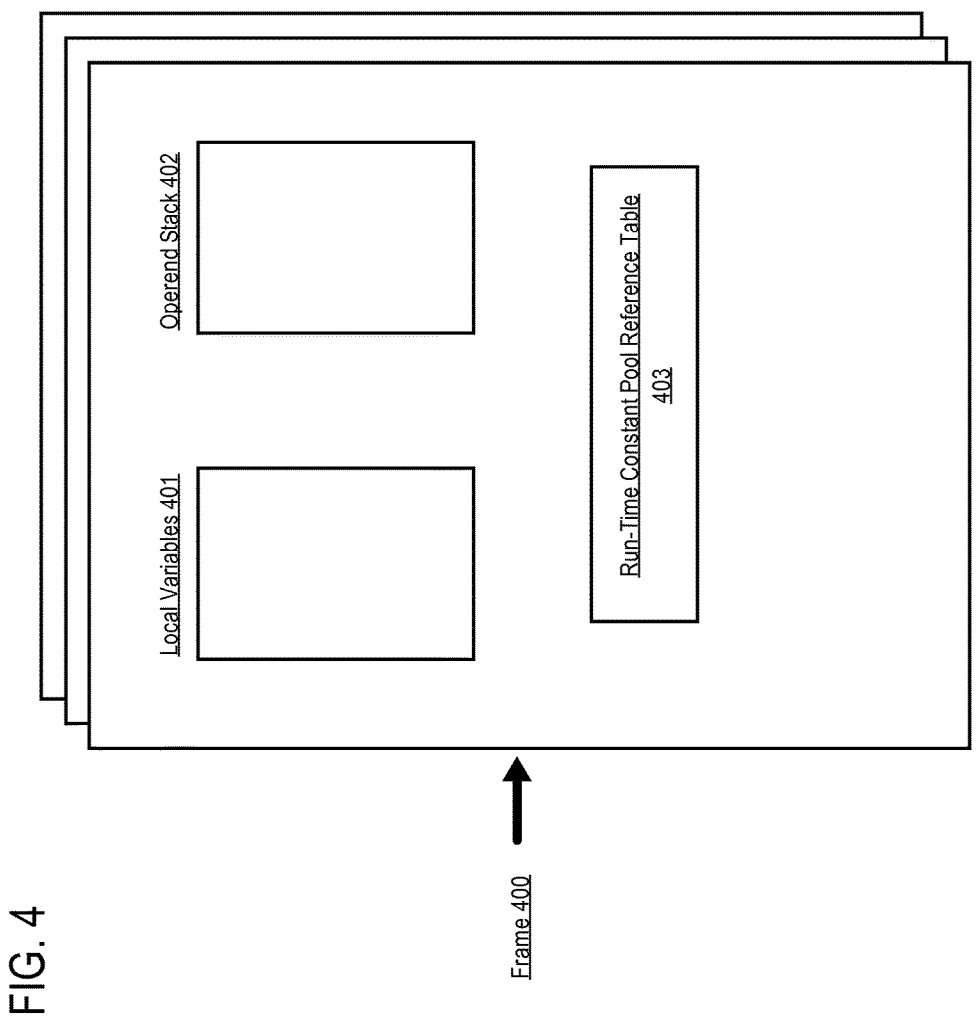
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403.

In an embodiment, the local variables 401 are represented as an array of variables that each hold a value, such as Boolean, byte, char, short, int, float, reference, and so forth. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 501 onto the operand stack 502. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the referred method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.0 JIT Compiler Issues

In an embodiment, the JIT compiler 109 is a fast compiler that translates virtual machine code derived from the class files 103 into native machine code as the program is executing. For example, the JIT compiler 109, when running on the machine of an end user, may execute the bytecodes and compile each method the first time it is executed. However, since the JIT compiler 109 runs on the execution machine in user time, the JIT compiler 109 can be constrained in terms of compile speed: if it is not very fast, then the user will perceive a significant delay in the startup of a program or part of a program. This entails a trade-off that makes it far more difficult to perform advanced optimizations, which can slow down compilation performance significantly.

In addition, even if the JIT compiler 109 had time to perform full optimization, such optimizations may be less effective for certain languages. To illustrate clear examples, the following will demonstrate the differences using the example languages of Java and C++.

For example, the Java language is dynamically "safe" (unlike C++), meaning that the JVM ensures that programs do not violate the language semantics or directly access unstructured memory. As a result, the JVM frequently performs dynamic type-tests (e.g. when casting, when storing into object arrays, and so forth). In addition, the Java language allocates all objects on the heap, in contrast to a language such as C++, where many objects are stack allocated. This means that object allocation rates are much higher for the Java language than for C++. In addition, because the Java language is garbage collected, it has very different types of memory allocation overhead (including potentially scavenging and write-barrier overhead) than C++.

Furthermore, in the Java language, most method invocations are virtual (potentially polymorphic), and are more frequently used than in C++. This means not only that method invocation performance is more dominant, but also that static compiler optimizations (especially global optimizations such as inlining) are much harder to perform for method invocations. Many optimizations are most effective between calls, and the decreased distance between calls in the Java language can significantly reduce the effectiveness of such optimizations since the JVM has smaller sections of code to work with when determining optimizations.

Finally, Java technology-based programs can change on the fly due to a powerful ability to perform dynamic loading of classes. This makes it far more difficult for the JVM to perform many types of global optimizations. For example, the compiler must not only be able to detect when these optimizations become invalid due to dynamic loading, but also be able to undo or redo those optimizations during program execution, even if they involve active methods on the stack. Furthermore, this optimizing and deoptimizing of code must be done without compromising or impacting program execution semantics.

As a result, attempts to achieve fundamental advances in performance for certain dynamic languages, such as the Java language, rely on nontraditional answers to these performance issues, rather than blindly applying traditional compiler optimization techniques.

In an embodiment, the virtual machine 104 addresses performance issues, such as the ones described above, by using adaptive optimization technology.

3.1 Hot Spot Detection

Adaptive optimization takes advantage of the fact that virtually all programs spend the vast majority of their time executing a minority of their code. Rather than compiling method by method, just in time, the virtual machine 104 immediately runs the program using the interpreter 108 and analyzes the code as it runs to detect the critical hot spots in the program. Then the virtual machine 104 focuses the attention of a global native-code optimizer on the hot spots. By avoiding compilation of infrequently executed code (most of the program), the JIT compiler 109 can devote more attention to the performance-critical parts of the program, without necessarily increasing the overall compilation time. This hot spot monitoring is continued dynamically as the program runs, so that the virtual machine 104 adapts its performance on the fly, even if new code is dynamically inserted into the run-time environment 113 that alters the frequency with which certain portions of the code are executed.

A subtle but important benefit of this approach is that by delaying compilation until after the code has already been executed for a while (measured in machine time), profiling information can be gathered on the way the code is used, and then utilized to perform more intelligent optimization, as well as decreasing the memory footprint. In some embodiments, in addition to collecting information on hot spots in the program, other types of information are gathered, such as data on caller-callee relationships for virtual method invocations.

3.2 Method Inlining

The frequency of virtual method invocations can be a bottleneck in many programming languages. Thus, once the virtual machine 104 has gathered sufficient information during execution about program hot spots, the JIT compiler 109 is used not only to compile the hot spot into native code, but also performs extensive method inlining on that code.

Inlining has important benefits, such as dramatically reducing the frequency of method invocations, which saves the time needed to process and perform those method invocations. For example, no new stack frames need to be created and inserted into the stack of the executing thread. In addition, inlining is synergistic with other code optimizations since larger blocks of code become available for the JIT compiler 109 to analyze. This creates a situation that significantly increases the effectiveness of compiler optimizations, overcoming a major obstacle to increased performance.

In some embodiments, for potential polymorphic "virtual" method invocations, the virtual machine 104 takes advantage of "monomorphic dispatch", which relies on the observed fact that, usually, there are no paths through a method that cause an object reference to be of one type most of the time but of another type at other times. Thus, in the majority of cases, if a method is called on an object of a particular type, it is unlikely that the method will also be called on an object of a differing type. However, although a minority of cases, a subtype is always a valid instance of a supertype (this principle is known as the "Liskov substitution principle"). This situation means that there could be two paths into a method—for example, one that passes an instance of a supertype and one that passes an instance of a subtype, resulting in different method implementations being called for the same method invocation. As a result, the virtual machine 104 may not be able to inline the call unless it is otherwise known (or suspected) that only one method implementation will actually be invoked by the caller.

In the usual case (the monomorphic case), having different, path-dependent types does not happen. As a result, the virtual machine 104 (by keeping track of profiling information, such as argument types) knows the exact method implementation that will be executed when the method is called on a passed object. In such cases, the virtual machine 104 can eliminate the overhead of doing virtual method lookup, so the JIT compiler 109 can emit optimized machine code for inlining, even for virtual method calls.

3.3 Dynamic Deoptimization

Although inlining, described in the last section, is an important optimization, inlining has traditionally been very difficult to perform for dynamic object-oriented languages like the Java language. While detecting hot spots and inlining the methods those hotspots invoke is difficult enough, knowing where to inline is not alone sufficient in the face of languages that can not only change their patterns of method invocation on the fly, but also load new code into a running program.

Inlining is based on a form of global analysis. Dynamic loading significantly complicates inlining, because the new code changes the global relationships in a program. A new class may contain new methods that need to be inlined in the appropriate places. Therefore, in some embodiments, the virtual machine 104 is able to dynamically deoptimize (and then reoptimize, if necessary) previously optimized hot spots, even while executing code for the hot spot. For instance, the virtual machine 104 may inject guard code within the optimized hot spots that checks to see if a profiling-based assumption used to perform the optimization is still actually valid when the optimized code is executed. If not, the optimized hot spot is instead executed using deoptimized code (e.g. the original method call), and/or re-optimized based on updated profiling-based assumptions. Without this detection and/or deoptimization capability, general inlining would be difficult to perform safely for dynamic languages.

3.4 Example Client Compiler

In some embodiments, the virtual machine 104 potentially includes a variety of different JIT compilers and/or a JIT compiler 109 with a variety of different components and/or settings.

In one embodiment, the JIT compiler 109 is a client compiler (also referred to as a "C1" compiler). C1 compilers are intended for cases where the program requires a fast startup time (for instance, a GUI application), but is not expected to execute long enough to make extensive optimizations worthwhile. In an embodiment, a C1 compiler is implemented as a fast three-phase compiler. In the first phase, a platform-independent front end constructs a high-level intermediate representation (HIR) from the virtual machine code. In some embodiments, the HIR uses static single assignment (SSA) form to represent values in order to more efficiently enable certain optimizations, which are performed during and after IR construction. In the second phase, the platform-specific back end generates a low-level intermediate representation (LIR) from the HIR. The final phase performs register allocation on the LIR using (for instance via a linear scan algorithm), does peephole optimization on the LIR, and generates machine-level code from the LIR.

Emphasis is placed on extracting and preserving as much information as possible from the virtual machine code. The C1 compiler focuses on local code quality and does very few (if any) global optimizations, since those are often the most expensive in terms of compile time.

3.5 Example Server Compiler

In one embodiment, the JIT compiler 109 is a server compiler (also referred to as a "C2" compiler), which is a high-end fully optimizing compiler. In some embodiments, the C2 compiler uses an advanced static single assignment (SSA)-based IR for optimizations. The optimizer performs a variety of optimizations, including dead code elimination, loop invariant hoisting, common subexpression elimination, constant propagation, global value numbering, global code motion, null-check elimination, range-check elimination, optimization of exception throwing paths, and so forth. In an embodiment, the C2 compiler performs register allocation via a global graph coloring allocator and makes full use of large register sets that are commonly found in many microprocessors, such as RISC microprocessors. In some embodiments, in order to be highly portable, the C2 compiler relies on machine description files, which describe all aspects of the target hardware. While the C2 compiler may be slower than other JIT compilers, such as the C1 compiler, the C2 compiler is still much faster than conventional optimizing compilers, and the improved code quality pays back the compile time by reducing execution times for compiled code.

3.6 Compiler Optimizations

In an embodiment, the JIT compiler 109 supports a variety of advanced optimizations to enable high performance of both traditional straight-line programs as well as object-oriented programming styles. Some of these optimizations include (but are not limited to):

Deep inlining and inlining of potentially virtual calls: as described above, method inlining combined with global analysis and dynamic deoptimization can eliminate a substantial amount of the overhead of calling methods within a program.

Fast instanceof/checkcast: Accelerating dynamic type tests to further reduce run-time cost of programming in object-oriented style.

Range check elimination: An index bounds check can be eliminated when the JIT compiler 109 can prove that an index used for an array access is within bounds.

Loop unrolling: a compiler optimization that enables faster loop execution. Loop unrolling increases the loop body size while simultaneously decreasing the number of iterations. Loop unrolling also increases the effectiveness of other optimizations.

Feedback-directed optimizations: the virtual machine 104 performs extensive profiling of the program in the interpreter before compiling the Java bytecode to optimized machine code. This profiling data provides even more information to the compiler about data types in use, hot paths through the code, and other properties. The compiler uses this information to more aggressively and optimistically optimize the code in certain situations. If one of the assumed properties of the code is violated at run time, the code is deoptimized and later recompiled and reoptimized.

3.7 Example JIT Compilation Techniques

In an embodiment, the virtual machine 104 automatically monitors which methods are being executed. Once a method has become eligible (by meeting some criteria, such as being called often), the method is scheduled for compilation into machine-level code, and it is then known as a hot method. In some embodiments, the compilation into machine code happens on a separate virtual machine 104 thread and will not interrupt the execution of the program. Thus, even while the compiler thread is compiling a hot method, the virtual machine 104 is able to keep on using the original, interpreted version of the method until the compiled version is ready.

3.8 Tiered Compilation

In some embodiments, the virtual machine 104 includes a JIT compiler 109 configured to perform tiered compilation. In tiered compilation, the JIT compiler 109 uses the C1 compiler mode at the start to provide better startup performance. However, when the application is properly "warmed up" (for instance, has been executing for a particular period of time, number of instructions, etc.), the JIT compiler 109 switches to C2 compiler mode to provide more aggressive optimization and thereby improve run-time performance.

3.9 Asynchronous Vs Synchronous Compilation

In an embodiment, the virtual machine 104 selects the methods to be compiled by the JIT compiler 109 based on the frequency of their execution. For example, when an interpreted call is executed, the virtual machine 104 may increment an "invocation counter", which is metadata stored in a profile structure associated with the called method. When the invocation counter exceeds a compilation threshold, the virtual machine 104 generates a compilation thread (or uses an existing compilation thread) to compile/optimize the method. As another example, the virtual machine 104 may keep track of the number of times a loop is iterated through in a method using a "backedge counter", and the compilation is triggered when the backedge counter reaches a compilation threshold.

The time at which the compilation occurs may be under the control of the virtual machine 104 and cannot be predicted in many cases. For example, if a section of critical code is only executed in rare conditions, the invocation counter of a method in that code may reach the threshold after a very long running time. Unless the condition on which the code is executed is predictable, there is no telling how long the program will need to run before the method is compiled. However, in some embodiments, methods may be associated with a particular keyword which informs the virtual machine 104 that the method should always be inlined when possible (for instance, during the first time the method is invoked/executed).

In an embodiment, compilation can be asynchronous or synchronous. In asynchronous (or background) compilation, the compilation of the called method is initiated, but the thread that initiated the compilation is not blocked waiting for the compilation to complete; the thread continues executing the method in interpreted mode. Compilation continues asynchronously, in the background. After the compilation is complete, subsequent invocations of that method will execute the compiled version. However, while methods are being interpreted, the CPU load can be so heavy that compilation is continuously delayed. In synchronous compilation, the thread that initiated the compilation is blocked until the method is compiled. After the compilation is complete, the thread executes the compiled method. This improves throughput earlier in the execution, but the application pauses during the compilation, and this can impact determinism. In some embodiments, asynchronous or synchronous compilation can be determined based on a command given at the startup of the virtual machine 104, a configuration file, or a keyword associated with each method (e.g. determined on a per-method basis).

In an embodiment, in the beginning of the execution, a method is executed in interpreted mode until JIT compilation is triggered by one of the internal counters. In the asynchronous embodiment, the thread that triggered the compilation continues executing the method in interpreted mode, while the compilation runs in the background (asynchronously). When the compilation finishes, subsequent invocations of the method will execute the compiled code, and execution time will be decreased.

4.0 Example Profiling Techniques

In an embodiment, a profile is information which summarizes the behavior of a virtual machine instruction at some profile point in the program being executed by the virtual machine 104. For example, in the context of the JVM, the profile points would correspond to bytecode instructions. The profile is used by the virtual machine 104 to determine when and where to compile and optimize sections of code, such as methods. However, while a profile point is associated with a particular virtual machine instruction, not all virtual machine instructions are necessarily profiled.

In some embodiments, the profile includes (for each profiled virtual machine instruction) the number of times the instruction has been executed by the interpreter 108. This execution count allows the JIT compiler 109 to estimate the frequency of future executions of that code. Furthermore, in addition to execution count, the profile may also include metadata such as branches recorded taken, switch paths taken, and (if conditional) untaken path counts. However, for certain instructions, such as those which operate on object references, additional metadata is stored in the profile related to the type of the object reference and/or whether a null has ever been observed for that reference.

4.1 Example Profile Data Structure

In an embodiment, profiles are metadata structures of records that are stored in the field and method data 306 section of the virtual machine memory layout 300 in association with each method. In some embodiments, the structure of the profile is laid out as a heterogeneous array which is sequenced in parallel with the index of the virtual machine instructions within the method code 305. In order to illustrate clear examples, the profile will be described in terms of an array containing a "profile record" at each index, where the index corresponds to the index of the associated virtual machine instruction. However, virtually any data structure that associates profile records with virtual machine instructions within the method can be utilized for this purpose. In an embodiment, only some of the virtual machine instructions are monitored for profile data, thus the array for the overall profile might contain more slots than the virtual machine instructions that are actually being profiled. For example, instructions that might be profiled include typecasts, stores to or from local variables, returns, method invocations, checkcasts, typecasts, instanceof checks, and so forth. Each record in the profile captures information for one instance of a virtual machine instruction in the method, which represents the profile points referred to above.

In an embodiment, a profile is not created when the class file hosting the associated method is first loaded, but rather when the method is noticed as relevant to execution (e.g., is warm enough, has been executed a sufficient number of times, has been executed for a particular amount of machine time, etc.). However, in other embodiments, the profile for the method is created during the first execution of the method. In an embodiment, each profile record applies to one virtual machine instruction in a method, and is affected by all executions of that instruction, regardless of the caller of that method. Thus, if Method A and Method B both call Method C, the profile points in Method C will account for instruction executions that result when Method C is called from either Method A or Method B.

The interpreter 108 collects information during the execution of the program and updates the method profiles. For example, the virtual machine 104 may update the profile records to indicate how many times a particular instruction in the method has been executed, how many times a particular loop has been executed, what reference types were utilized by the instruction, whether a null reference has been encountered, and so forth. However, in embodiments which use tiered compilation, the JIT compiler 109 may also collect profile information when compiled code is executed for use when the C2 compiler mode becomes active. For example, the C1 compiler may perform a lesser degree of optimization that does not utilize profile information or may utilize only certain parts of the profile information. However, the C1 compiler in some embodiments produces code that still collects the profiled information in the event that the JIT compiler 109 is switched to C2 operation.

4.2 Example Type Profile

In some embodiments, a profile record contains information as to the type of a reference encountered by the corresponding virtual machine instruction. The type information is designed to allow the JIT compiler 109 to predict future types at the same point in the program.

As mentioned above, a profile point represents a specific instance of a virtual machine instruction in a method. The type information recorded in the profile record for that virtual machine instruction can include virtually any reference utilized by the instruction, such as the type of the receiver the method is being called on (e.g. for invokevirtual instructions) and/or the types of the arguments to the instruction. In addition, the record may also indicate whether the reference has ever been observed as null at the profile point. In some embodiments, return instructions are also type profiled, including the observed types of returned references. The receiver, arguments, and return value will be referred to as "operands" to the virtual machine instruction or "variables" of the virtual machine instruction. In some embodiments, the virtual machine 104 determines the types of references by examining a data structure associated with the referenced object in the virtual machine memory layout 300 (such as the heap 302). For example, each object allocated by the virtual machine 104 could contain a header that identifies the object's type. Furthermore, the header may also contain or link (directly or indirectly) to information concerning the object's supertypes.

In some embodiments, the virtual machine instructions which are type profiled include (but are not limited to) store into a reference in an array, cast check, instance check, and/or invoking a virtual or interface method. Using Java as an example, the following table includes example bytecodes with their profiled operands:

| Profile Point Bytecode | Type Profiled Operand |
| --- | --- |
| aastore | element value |
| checkcast, instanceof | tested object |
| invokevirtual, invokeinterface | receiver |

In some embodiments, the types of primitive values, non-receiver arguments, and/or return values are also profiled.

4.3 Type Profile Structure

In an embodiment, the type profile records include, for each original instance of a type-profiled virtual machine instruction, one or more observed types for each operand. For example, each profile record may include a few rows, each row specifying a type for the operand (such as a class) and the number of times the operand has been observed as being of that class. In some embodiments, to save space, the virtual machine 104 limits the number of rows for each profile record. Thus, the record may also store an overall count. When the overall count is much greater than the sum of the rows, this could indicate that the virtual machine 104 optionally should add more rows to the profile record and/or that the structure is subject to significant profile pollution. In some embodiments, the number of rows stored for each type profile record is controlled by a configuration file or a value entered during the startup of the virtual machine 104.

4.4 Profile Pollution

Profiles are subject to pollution if the profiled code is heavily reused in divergent ways. Using Java as an example, if the method ArrayList.contains is used with lists that never contain nulls, some null checks will never be taken, and the profile will reflect this fact. However, if ArrayList.contains is also used with lists that occasionally contain nulls, then the "taken" count of the null check instruction may become non-zero. This in turn may influence the JIT compiler 109 to check operands more cautiously, with a loss of performance for all uses of the method. However, the null case may only be observed as a result of certain callers (methods that call ArrayList.contains), but not others. Nonetheless, the JIT compiler 109, as a result of observing that the taken count on the null check instruction is non-zero, would still cause a performance hit to callers which never pass the reference as null.

As a more complex example, if ArrayList.contains is only ever used on arrays that contain Strings, then the type profile will reflect this fact, and the virtual call to Object.equals used to implement ArrayList.contains on each element can be optimistically inlined as if it were an invokespecial of String.equals. However, if Object.equals is used by other callers in a different context, for example on Integer.equals, the type profile information for Object.equals would indicate mixed types, which would prevent Object.equals from being inlined.

4.5 Failure Modes

In an embodiment, profiles have two failure modes. In the first failure mode, a method might be compiled before its profile exists and/or is "mature", so that no stable conclusions can be drawn about operands in that method. In the second failure mode, a method might be used from many different contexts with independent operand types (as with ArrayList.contains example discussed earlier), so that the profile becomes "polluted" by many independent types.

Polluted profiles stem from the fact that a method (containing generically reusable code) has, in an embodiment, only one profile structure, but the method is reused from a variety of contexts, providing a variety of operand types.

4.6 Data Type Flow Structures

Data-flow analysis is a technique for gathering information about the possible set of values calculated at various points in a computer program. A control flow graph (CFG) or other suitable data flow structure (e.g. an abstract interpretation of the program code in conjunction with a working set of program counters) is used to determine those parts of a program to which a particular value assigned to a variable might propagate. For example, each node in the control flow graph may represent a "block" of code, the blocks being separated by "jump" instructions, such as an if statement, method call, switch, and so forth. The edges between the nodes then represent the possible "jumps" that can be performed, thus showing how the program can execute from one block of code to the next. In an embodiment, the information contained in a control flow graph is gathered by the JIT compiler 109 from the code being compiled and is used during optimization.

In one embodiment, the JIT compiler 109 performs data-flow analysis is by setting up data-flow equations for each node of the control flow graph and repeatedly solves the equations by calculating the output from the input locally at each node until the whole system stabilizes (reaches a "fixpoint"). Example data flow structures and applications of data flow structures are described, without limitation, in Khedker, Uday P. Sanyal, Amitabha Karkare, Bageshri. Data Flow Analysis: Theory and Practice, CRC Press (Taylor and Francis Group), 2009, the entire contents of which are hereby incorporated by reference for all purposes, as if set forth herein.

4.7 Example Virtual Machine Type System

In this section, an example type system for the virtual machine 104 is described. However, the techniques described herein are adaptable to a variety of type systems. To illustrate clear examples, the type system is assumed to be implemented using a data flow structure, but other data structures can also be substituted.

In an embodiment, the type system propagates type information in the program that is being compiled. The type system comprises a set of equations that define how types flow in the program. The type system sees through copies of program values. Consider, for instance, the following example program code (note that while the examples are given with respect to Java source code, the concepts equally apply other forms of code):

```
void m( ) {
    A a = new A( ); // a of type A
    Object o = a; // o is declared as Object but because it is
assigned something of type A, o is of type A }
void m1( ) {
    A a = new A( );
    m2(a);
}
void m2(Object o) {
    // o used here
}
```

If the JIT compiler 109 considers m2 alone, the JIT compiler 109 would be unable to infer much about type of variable o other than that it is a generic Object. However, if m2 is inlined into m1 during compilation (the compiler effectively copies the body of m2 inside m1 where m2 is called), then because a is of type A the type system allows the JIT compiler 109 to deduce that the parameter o to m2 is of type A as well.

The type system can deal with a variety of forms of control flow:

```
class A {
}
class B extends A {
}
class C extends A {
}
void m( ) {
    Object o = null;
    if (...) { // some condition
        o = new B( ); // o of type B in this branch
    } else {
        o = new C( ); // o of type A in this branch
    }
    // What is the type of o here?
}
```

For example, the type system, by solving the equations, would be able to merge types of o in both of the above branches. In this particular case, the type system could infer that o is at least of type A, but not necessarily whether o is of type B or C. However, this is still a vast improvement on what the declaration indicates, which is that o is of generic type Object.

```
void m(Object o1) {
    Object o2 = (A)o2;
    // what's the type of o2?
}
```

In the above example, the type system computes A as type of o2 after the cast instead of declared type Object.

5.0 Type Speculation

In an embodiment, type profiling data is collected as the virtual machine 104 runs the program using the interpreter 108. When sufficient data is available, the JIT compiler 109 takes advantage of the profiling to generate code tailored to the observed execution patterns. Taking advantage of the profiling data has a cost, particularly for dynamic languages, in that the JIT compiler 109 must in certain situations inject guard code to emit a runtime check to validate the profiling data. Thus, in some embodiments, the JIT compiler 109 makes a decision as to whether the cost pays off. For example, the profiling data available to the JIT compiler 109 at the profiling point may indicate where it was collected (e.g. calls and type checks) and the JIT compiler 109 can balance the gain from using the profile data (e.g. allowing inlining or providing a simpler type check) with its cost (the runtime check). If the optimization is estimated to result in faster run-time execution, then the JIT compiler 109 performs the optimization. Otherwise, the JIT compiler 109 skips that optimization when compiling the method.

For dynamic languages, the approach summarized above is sometimes insufficient: the number of program points where profiling would be helpful increases while at the same time the accuracy of the data collected decreases due to profile pollution. To address this and other problems, in some embodiments the virtual machine 104 collects profile data at profiling points that are more generic than conventional profiling points, such as parameters on method entry, return values from calls, and so forth. In some cases, profiling data can then be made available to the JIT compiler 109 at virtually every program point during compilation by piggy backing on the type system (or any suitable data type flow structure). In an embodiment, in addition to the known type of a value, the type system assigns a speculative type, which is computed based on propagating the type profiling data collected for specific values at specific points in the data flow to linked values at other points in the data flow, in similar manner to the way the type system computes known types from linked type declarations in the code.

Using speculative type information can help fight profile pollution, since profiling data propagated from the outer most context to a program point may provide more accurate data for the program point than would the type profiling data collected for the program point by itself. This also helps fight the lack of profiling at some program points, since profiling data is available at virtually every program point during compilation. Thus, the JIT compiler 109 may be configured to only emit a runtime check when the compiler uses the profiling data at a program point where the profiling data is useful. As a consequence, deciding whether using the profiling data pays off remains straightforward for the JIT compiler 109 even though the profiling data that is used may not have been collected at the program point being optimized.

For example, consider the following example Java code:

```
class A {
    ...
    void run( )
    {
        ...                    // do something
    }
    ...
}
class B extends A {
    void run( )
    {
        ...                    // do something
    }
}
class C extends A {
```

```
    void run( )
    {
        ...                    // do something
    }
}
void m1( ){
    C o = new C( );           // create object of type C
    m3(o);                    // m3 called with object of type C
}
void m2( ){
    B o = new B( );           // create object of type B
    m3(o);                    // m3 called with object of type B
}
void m3(A p)
{
    p.run( );                 // call run( ) on passed object p
}
```

In the above example code, Class B and Class C each override the run method defined in Class A. Furthermore, method m1 calls method m3 passing an object of class C as a parameter and method m2 calls method m3 passing an object of type B as a parameter. Method m3 calls run on the passed object. Assuming both m1 and m2 have been executed a non-zero number of times, the profile record for the run invocation within m3 could appear as follows [B, x], [C, y], where x is the number of times B has been observed as the type of object p and y is the number of times C has been observed as the type of object p. Thus, the profile record for the run invocation in m3 is polluted since the receiver p has been observed to be of type B sometimes and type C at other times. If the virtual machine 104 selects m1 for compilation (for instance, due to execution from a higher level method), the inlining of run would be stuck since the virtual machine 104 would be unable to resolve which implementation of run should be moved upward. However, assuming the virtual machine 104 stores the argument types in the profile record of the m3 invocation instruction in m1, the pollution of the run call can be resolved by using the passed argument information to solve for the type for p. Thus, profiled parameter types at the call site can be passed down to the callee and used to fuel optimizations that would otherwise not be possible.

In some embodiments, even if the run invocation within m3 in the above example was not profiled, as long as a point further upstream in the program has been profiled, that information can still trickle down to help resolve object types downstream. In some embodiments, the return instructions are also type profiled. Thus, in addition to type information being passed downstream in the program flow, the type information can be passed back upstream as well. As a result, provided sufficient profiling points, object types can be speculated by induction at virtually any point in the program, even at instructions which have not been explicitly profiled. As mentioned above, the flowing can be performed by generating a program model, such as a control flow graph, program dependency graph, data flow equations, combination thereof, and so forth, inserting the known types (e.g. declarations) and the speculative types (e.g. profiled instructions), and determining potential types of objects based on the dependencies.

5.1 Example Speculative Profiling Details

Figure 5:
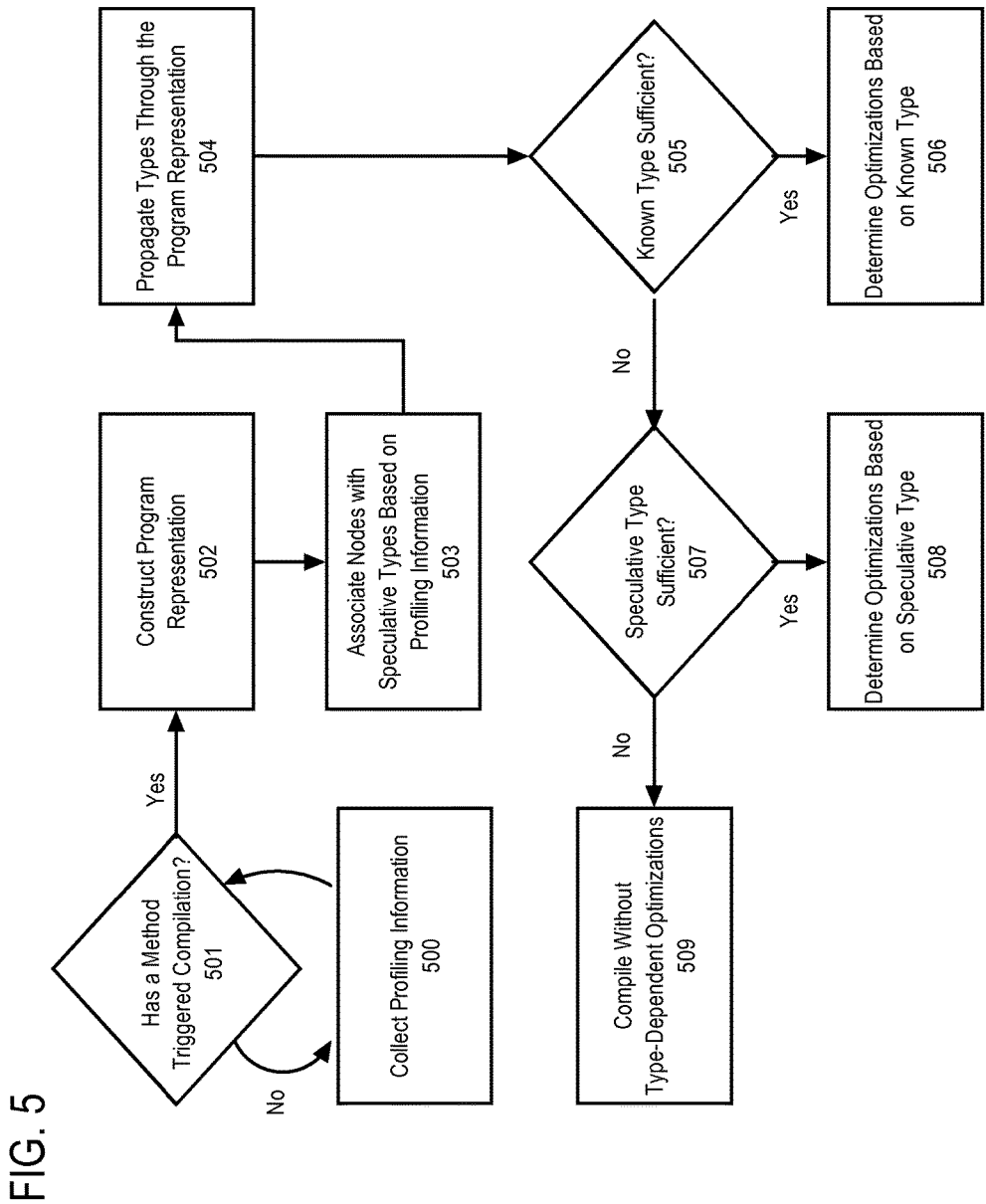
FIG. 5 illustrates a process for performing optimizations based on speculative profiling in block diagram form according to an embodiment.

FIG. 5 illustrates a process for performing optimizations based on speculative profiling in block diagram form according to an embodiment. To provide clear examples, the following description assumes the process of FIG. 5 is performed by the virtual machine 104 and components thereof.

At block 500, the virtual machine 104 collects profiling information for virtual machine instructions. In an embodiment, prior to optimization, during execution of a given method or other unit of program code by, for instance, the interpreter 108 or the JIT compiler 109 functioning in C1 mode, type profiling data is collected for values at predefined profile points, and then recorded within a profiling data structure. Profile points may be specified, for example, in the form of (m,bci), where m refers to a method identifier and bci refers to a bytecode index. The profile point is then associated with a data structure that indicates usage information for that profile point, such as number of times executed, receiver type, argument types, which references have been observed as null, and so forth.

At block 501, the virtual machine 104 determines whether a method should be compiled. In an embodiment, the virtual machine 104 determines that a method should be compiled based on profiling information collected by the virtual machine 104 at block 500. For example, the profiling information may indicate that a particular method has been executed a threshold number of times or that a loop within the method has been iterated a threshold number of times. In response to determining that a method should be compiled, the virtual machine 104 moves to block 502. Otherwise, the virtual machine 104 returns to block 500 and continues to collect profiling information. In some embodiments, the virtual machine 104 compiles arbitrary blocks of code, rather than an entire method. Thus, the code scheduled for compiling could include a loop, a code block, a method, a series of methods, and so forth.

In some embodiments, the virtual machine 104 also determines how deep the compilation should be. For example, the virtual machine 104 may include a threshold value that indicates how many method calls in the program should attempt to compile and/or perform optimizations. However, in other embodiments, the virtual machine 104 may perform a dynamic check to determine whether continuing the compilation is likely to provide sufficient returns compared to the time required to perform the deeper compilation. The remaining blocks will refer to the "method" being compiled, but depending on the embodiment, the "method" may also include calls to other methods downstream a particular number of levels. Thus, the virtual machine 104 may view the totality of the called methods as a program segment which is acted on by the remainder of the blocks. Alternatively, the remainder of the blocks could be repeated starting from the lowest level methods to be considered and merged upwards through the higher level methods.

At block 502, the virtual machine 104 constructs a representation of the method being compiled. In some embodiments, the representation could be implemented as a CFG, program dependency graph, data flow equations, or combinations thereof. In an embodiment, the JIT compiler 109 implements the data flow structure using a representation where the nodes represent code blocks that are separated by jumps/decision points (such as if statements, method invocations, switches, and so forth), and the edges represent the control flow between the code blocks. In an embodiment, the representation includes equations that determine, for each node, the input and output transformations of variable types within the associated blocks of code. Thus, given a known or speculative type at one instruction, the virtual machine 104 can utilize the representation to determine variables types for other dependent instructions in the program. In some embodiments, when generating the representation of the program, the virtual machine 104 populates the nodes/equations with indicators of the known types of references. For example, if a node represents code which generates an object, then the type of that object is known for a certainty to be the generated type. Furthermore, there could be other factors that allow for a type to be known, such as if a reference is declared as a type that is final or is otherwise known to have no sub-types. The exact techniques used to determine whether a type of a reference utilized by a particular instruction is "known" is not critical. Furthermore, it is not necessary for the representation to include nodes, in some embodiments equations which govern the flow type dependents could be utilized without generating an actual graph. In some embodiments, the virtual machine 104 constructs the representation of the method being compiled while parsing the method.

At block 503, the virtual machine 104 associates nodes in the program representation with the types recorded in the profiling information. In an embodiment, the JIT compiler 109 records a previously observed profile type (e.g. found in the profiling information collected at block 500) with the appropriate nodes/equations in the representation constructed at block 502. For example, the virtual machine 104 may add information to each node that covers a profile point indicating the type of the observed reference. In some embodiments, each node/equation in the program representation is modified to include a tuple of the form (known type, speculative type) or alternatively additional nodes or equations can be added to the representation to separately track the flow of known and speculative types.

At block 504, the virtual machine 104 propagates the known and speculative type information through the representation. In an embodiment, the virtual machine 104 propagates the known and speculative type information through the data flow structure by using the equations associated with each code block. For example, the virtual machine 104 may use the equations to map the speculative type at a node as the input to a connected node to produce an output representing the speculative type at the connected block (e.g. $\{K1, S1\}\char`\^\{K2, S2\}=\{K1\char`\^K2, S1\char`\^S2\}$). Thus, the value of a reference at an instruction can be dependent on the type profiling information stored for that instruction and/or the types associated with variables on which the instruction depends. This process can then be repeated to propagate the known and speculative types throughout the data flow structure. In some embodiments, types are propagated until an equilibrium point is reached in the program where the potential types stop changing or until a particular number of iterations have been performed.

At block 505, the JIT compiler 109 determines whether the known value associated with the code segment is sufficient to determine which optimizations are beneficial. If so, the JIT compiler 109 proceeds to block 506 and determines which optimizations to perform on the segment based on the known value type. The JIT compiler 109 then performs those optimizations when compiling the method. However, if the virtual machine 104 is unable to determine which optimizations to perform on the code segment based on the known type, the virtual machine 104 proceeds to block 507.

At block 507, the virtual machine 104 determines whether the speculative value associated with the code segment is sufficient to determine which optimizations are beneficial. If so, the JIT compiler 109 proceeds to block 508 and determines which optimizations to perform based on the speculative value type. The JIT compiler 109 then performs those optimizations while emitting guard code to check if the value is of the speculative type. Otherwise, the JIT compiler 109 compiles the method without performing optimizations for that code segment at block 509. In an embodiment, the JIT compiler 109 determines whether to perform a particular optimization based on whether the run-time performance gain of that optimization overcomes the overhead of the guard code. The factors for the comparison are dependent on the exact optimization being analyzed. For example, some optimizations such as inlining might almost always considered beneficial, whereas the virtual machine 104 may perform risk vs. reward analysis for other optimizations. As another example of an optimization that is always considered beneficial, the virtual machine 104 could potentially replace a more general type check (which may involve a switch between multiple potential types) with the more specific type check of the guard code based on the speculative type.

In an embodiment, as a result of the process of FIG. 5, the profile information used at (m,bci) no longer comes solely from profile point at (m,bci), but instead (or in addition) from profile data collected with respect to the instruction that is calling m and/or any instruction that was parsed before parsing (m,bci). For instance, in the following code, the profiling data used for object o in m may include profiling data propagated from both m1 and m2.

```
void m1(Object o) {
    m2(o);
    m(o);
}
void m2(Object o) {
    // collect some profiling here
}
void m(Object o) {
    // can use it here even though m2 doesn't call m
```

Because the speculation is context sensitive, failed speculation at (m,bci) when inlined from a method m1 does not necessarily mean that the speculation will be incorrect when inlined from m2, thus increasing the situations where profiling data can be used for optimization. Further to this end, in an embodiment, when a guard fails, recording the failure at (m, bci) in the profile data structure might be too restrictive. In an embodiment, the JIT compiler 109 is configured to add a finer level of granularity, such as the location at which the failure is recorded. For instance, the compiler may record the failure at (m, bci, root of compilation) instead, where root of compilation indicates the context in which m was called (e.g. the calling method).

Among other benefits, the above described embodiment increases the program points at which type profiling information may be used, while ensuring that the optimized code pays the overhead of the guard only if the speculative type information is actually used. Moreover, in some embodiments, profiling may be made available everywhere in the flow of the program, not only at the profile point. This is because speculative types are flowing from the method entry to the inner level of inlining and, in some embodiments, from return instructions to the calling method. The speculative type thus helps fight profile pollution.

In an embodiment, the techniques described herein increase the benefit of profiling at points where profiling data is not conventionally collected, including, for instance, values exiting a method and values entering a method. For instance, arguments at invocations and returned values from invocations can be profiled.

5.2 Example Uses of Speculative Type Information—Inlining

Consider the following example where conventional profiling might lead to profile pollution:

```
class A {
    void m( ) { // do something
    }
}
class B extends A {
    void m( ) { // do something else
    }
}
class C extends A {
    void m( ) { // do something else
    }
}
void m1(A aa) {
    m2(aa);
}
void m2(A a) {
    a.m( );
}
```

The a.m( ) call in m2 is a virtual call. It would be preferable to inline the call for performance, but because the call is virtual, a.m( ) can be a call to either A.m or B.m or C.m. A static analysis of m2 cannot help the JIT compiler 109 decide whether it is A.m or B.m or C.m that is called, so conventionally the JIT compiler 109 would not inline the call.

A virtual call is a program point where profiling usually helps: while the program executes before compilation, the virtual machine 104 collects information about a at the virtual call in m2( ) If the virtual machine 104 sees that only a single type has been observed for a (e.g. B) at the virtual call, then during compilation the virtual machine 104 decides to inline B.m inside m2 using code similar in effect to the following:

```
void m2(A a) {
    if (a is indeed of type B) {
        // body of B.m copied here
    } else {
        // record that profiling failed here
    }
}
```

A problem with the above strategy is that m2 may be called from many other methods with every possible type (A, B, and C). If that happens, then profiling at the virtual call a.m( ) does not provide the JIT compiler 109 with any useful information and the JIT compiler 109 cannot inline the call.

In an embodiment, this problem is overcome using speculative types propagated through the type system. For instance, when compiling m1, the compiler inlines m2 into m1. The virtual machine profiles input parameters to m1. Assuming that m1's profile is not polluted, then from profiling, the JIT compiler 109 sees that it is likely that aa in m1 is of type, say, B. The compiler records this information with the type system. The type system propagates that information in the program and when it reaches the virtual call in m2, inlined in m1, the type system will conclude that a is most likely of type B, and that the JIT compiler 109 consequently can inline B.m using code of similar effect to the following:

```
void m1(A aa) {
    // m2 inlined
    if (aa is indeed of type B) {
        // body of B.m copied here
    } else {
        // record that profiling failed here
    }
}
```

On account of propagating the profiled type through the type system, other calls to a.m( ) might not necessarily result in the same inlined code. For instance, if another method m3 within the same program code as m1 calls a.m( ) with a value ab, and the profiled type for ab is C, the JIT compiler 109 would inline C.m( ) instead of B.m( ). Or, if m3's profile for ab was polluted (e.g. ab has previously been observed as either A or C), the compiler would instead simply choose not to inline any code for a.m( ) in m3.

The if statement within the above code is guard code injected by the JIT compiler 109 to catch cases where the profile-based assumption that aa is B might be incorrect. This guard code has a small but non-trivial cost, and the JIT compiler 109, in some embodiments, is configured to utilize a cost-benefit analysis to determine whether the benefit of inlining B.m( ) is likely to outweigh the expense of executing the guard code. If not, then no inlining would be performed.

If the guard code "fails," in that the assumption that aa is of the profiled type is incorrect, the failure is recorded, and in some embodiments m1 may need to be run with deoptimized code (since the virtual machine 104 may not have optimized code suitable for execution when the assumption fails). On account of the failure, optimized code that includes the above optimization may need to be deoptimized. In some embodiments, guard code only records the method and code index of the failure. However, in another embodiment, even though the failure happens in m2 (inlined in m1), the virtual machine 104 also records the root of the compilation (m1) as part of the failure. Hence, other code outside of the root of compilation may continue to optimize the a.m( ) call using speculative types because the failure is optimistically assumed to only occur when m2 is inlined from m1( ) This may avoid, for instance, having to deoptimize other code segments in which the a.m( ) call has already been optimized, as well as allow future optimizations of the a.m( ) call in yet other code segments.

5.3 Example Uses of Speculative Type Information—Optimizing Type Checks

In an embodiment, speculative type information may also or instead be utilized to optimize type check code. For instance, consider the following code.

```
class A {
}
class B extends a {
}
Object o;
if (o instanceof A) {
    ...
}
```

By propagating type profiling data through the type system, the virtual machine 104 may be able to determine that o is of speculative type B. Hence, the above if statement may be compiled as (omitting any guard code):

```
if (o.getClass( ) == B.class) {
    ...
}
```

The above code segment may turn out to be a shorter machine-code sequence than the full type check that would be required for the unoptimized statement.

5.4 Example Uses of Speculative Type Information—Cutting Unused Branches

In an embodiment, the JIT compiler 109 uses the speculative types to cut branches in the code that are not taken. Consider a case similar to the type check above:

```
if (o instanceof A) {
    // do something
} else {
    // do something else
}
```

If o is of speculative type B, this statement could be compiled as (again, omitting any guard code):

```
if (o.getClass( ) != B.class) {
    // stop execution here
}
// do something
```

The else branch thus is not compiled and does not exist as far as the compiled code is concerned. That helps the JIT compiler 109 makes better decision for code that follows.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
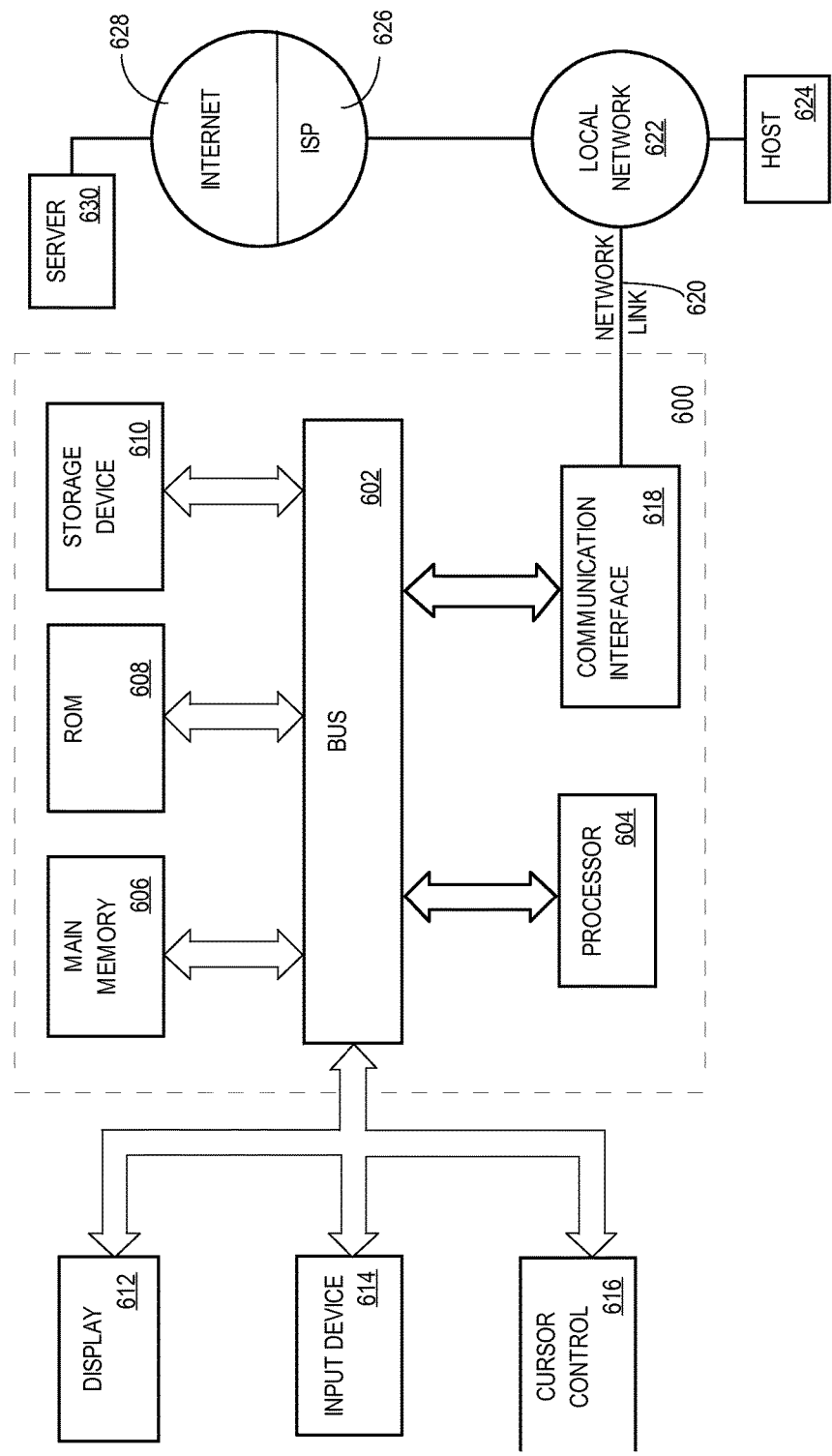
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a light emitting diode (LED) display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

8.0 Additional Disclosure

Aspects of the subject matter described herein are set out in the following numbered clauses:

1. A method comprising: storing type profiling data for program code, the type profiling data indicating observed types for profiled values within the program code at specific profile points during previous executions of the program code; determining to optimize a particular code segment of the program code; generating a program representation describing a flow of data through different variables within the code segment; assigning speculative types to certain variables in the particular code segment by: assigning speculative types of first variables to respective observed types recorded in the type profiling data; calculating speculative types of second variables, based at least partially on propagating the speculative types of the first variables through the program representation; compiling the particular code segment, at least in part, by optimizing one or more instructions within the particular code segment based at least in part on one or more of the speculative types of variables utilized by the one or more instructions, including at least one of the speculative types of the second variables, wherein the method is performed by one or more computing devices.

2. The method of Clause 1, wherein the program representation includes one or more of: a control flow graph, a program dependency graph, or one or more data flow equations.

3. The method of any of Clauses 1-2, wherein the program representation comprises nodes that correspond to the different variables, the nodes being interconnected based on data flow of the program code.

4. The method of any of Clauses 1-3, wherein determining to optimize the particular code segment is responsive to determining that the particular code segment has been executed in a less optimized form at least a threshold number of times.

5. The method of any of Clauses 1-4, further comprising: assigning known types to one or more of the certain variables within the particular code segment based on type declarations within the particular code segment; and compiling the particular code segment in part by optimizing a second one or more instructions based at least in part on one or more of the known types.

6. The method of claim 5, wherein the one or more instructions are optimized based on the speculative types of the second variables only when a known type for a particular variable of the one or more instructions cannot be utilized for a particular optimization.

7. The method of any of Clauses 1-5, wherein optimizing the one or more instructions includes emitting guard code that checks whether a particular variable of the one or more instructions is a speculative type calculated for the particular variable when assigning the speculative types.

8. The method of Clause 7, wherein optimizing the one or more instructions includes performing a determination that optimizing the one or more instructions based on the speculative type for the particular variable outweighs an overhead cost associated with executing the guard code.

9. The method of any of Clauses 7-8, further comprising: executing the guard code to determine that the particular variable is not the speculative type and in response performing one or more deoptimizations on the one or more instructions.

10. The method of any of Clauses 1-9, wherein propagating the speculative types of the first variables through the program representation is performed by at least determining that a second variable is linked to a first variable in the program representation, and, in response: setting a speculative type of the second variable to a speculative type of the first value, or calculating the speculative type of the second variable based on both the speculative type of the first variable and a second observed type recorded for the second value in the profiling data, or calculating the speculative type of the second variable based on a speculative type of a third variable linked to the second variable in the program representation.

11. The method of any of Clauses 1-10, further comprising: identifying a virtual call within the one or more instructions, the virtual call associated with a particular variable of the second variables, wherein the virtual call invokes a particular set of instructions of a plurality of sets of instructions based on a type to which the particular variable conforms; generating an optimized version of the one or more instructions by replacing the virtual call with the particular set of instructions of the plurality of sets of instructions that is associated with the speculative type of the particular value.

12. The method of any of Clauses 1-11, wherein the type profiling data includes, for a particular profile point, a type associated with a variable passed as an argument by the particular profile point or a type associated with a variable returned at the particular profile point.

13. A non-transitory computer-readable storage medium storing a plurality of instructions which, when executed by one or more processors, cause the one or more processors to perform steps comprising: storing type profiling data for program code, the type profiling data indicating observed types for profiled values within the program code at specific profile points during previous executions of the program code; determining to optimize a particular code segment of the program code; generating a program representation describing a flow of data through different variables within the code segment; assigning speculative types to certain variables in the particular code segment by: assigning speculative types of first variables to respective observed types recorded in the type profiling data; calculating speculative types of second variables, based at least partially on propagating the speculative types of the first variables through the program representation; compiling the particular code segment, at least in part, by optimizing one or more instructions within the particular code segment based at least in part on one or more of the speculative types of variables utilized by the one or more instructions, including at least one of the speculative types of the second variables.

14. The non-transitory computer-readable storage medium of Clause 13, wherein the program representation includes one or more of: a control flow graph, a program dependency graph, or one or more data flow equations.

15. The non-transitory computer-readable storage medium of any of Clauses 13-14, wherein the program representation comprises nodes that correspond to the different variables, the nodes being interconnected based on data flow of the program code.

16. The non-transitory computer-readable storage medium of any of Clauses 13-15, wherein determining to optimize the particular code segment is responsive to determining that the particular code segment has been executed in a less optimized form at least a threshold number of times.

17. The non-transitory computer-readable storage medium of any of Clauses 13-16, wherein the steps comprise: assigning known types to one or more of the certain variables within the particular code segment based on type declarations within the particular code segment; and compiling the particular code segment in part by optimizing a second one or more instructions based at least in part on one or more of the known types.

18. The non-transitory computer-readable storage medium of Clause 17, wherein the one or more instructions are optimized based on the speculative types of the second variables only when a known type for a particular variable of the one or more instructions cannot be utilized for a particular optimization.

19. The non-transitory computer-readable storage medium of any of Clauses 13-18, wherein optimizing the one or more instructions includes emitting guard code that checks whether a particular variable of the one or more instructions is a speculative type calculated for the particular variable when assigning the speculative types.

20. The non-transitory computer-readable storage medium of Clause 19, wherein optimizing the one or more instructions includes performing a determination that optimizing the one or more instructions based on the speculative type for the particular variable outweighs an overhead cost associated with executing the guard code.

21. The non-transitory computer-readable storage medium of any of Clauses 19-20, wherein the steps further comprise: executing the guard code to determine that the particular variable is not the speculative type and in response performing one or more deoptimizations on the one or more instructions.

22. The non-transitory computer-readable storage medium of any of Clauses 13-21, wherein propagating the speculative types of the first variables through the program representation is performed by at least determining that a second variable is linked to a first variable in the program representation, and, in response: setting a speculative type of the second variable to a speculative type of the first value, or calculating the speculative type of the second variable based on both the speculative type of the first variable and a second observed type recorded for the second value in the profiling data, or calculating the speculative type of the second variable based on a speculative type of a third variable linked to the second variable in the program representation.

23. The non-transitory computer-readable storage medium of any of Clauses 13-22, wherein the steps further comprise: identifying a virtual call within the one or more instructions, the virtual call associated with a particular variable of the second variables, wherein the virtual call invokes a particular set of instructions of a plurality of sets of instructions based on a type to which the particular variable conforms; generating an optimized version of the one or more instructions by replacing the virtual call with the particular set of instructions of the plurality of sets of instructions that is associated with the speculative type of the particular value.

24. The non-transitory computer-readable storage medium of any of Clauses 13-22, wherein the type profiling data includes, for a particular profile point, a type associated with a variable passed as an argument by the particular profile point or a type associated with a variable returned at the particular profile point.

What is claimed is:
1. A method comprising:
 storing type profiling data for program code into a profile that is not created until an invocation of a particular code segment begins or said particular code segment has been repeatedly executed, wherein:
  the type profiling data contains one or more associations,
  each association of the one or more associations indicates a respective intermediate code instruction and observed types for profiled values used by the respective intermediate code instruction during previous executions of the program code, and
  at least one association of the one or more associations indicates: a) an intermediate code instruction that invokes a function, and b) an observed type of a receiver of said function;
 determining to optimize said particular code segment of the program code;
 generating a program representation describing a flow of data through different variables within the particular code segment;
 assigning, in response to said determining to optimize, speculative types to certain variables in the particular code segment by:
  assigning speculative types of first variables to respective observed types recorded in the type profiling data; and
  calculating speculative types of second variables, based at least partially on propagating the speculative types of the first variables through the program representation;
 compiling the particular code segment, at least in part, by optimizing one or more instructions within the particular code segment based at least in part on one or more of the speculative types of variables utilized by the one or more instructions, including at least one of the speculative types of the second variables,
 wherein the method is performed by one or more computing devices.

2. The method of claim 1, wherein the program representation includes one or more of: a control flow graph, a program dependency graph, or one or more data flow equations.

3. The method of claim 1, wherein the program representation comprises nodes that correspond to the different variables, the nodes being interconnected based on data flow of the program code.

4. The method of claim 1, wherein determining to optimize the particular code segment is responsive to determining that the particular code segment has been executed in a less optimized form at least a threshold number of times.

5. The method of claim 1, further comprising:
 assigning known types to one or more of the certain variables within the particular code segment based on type declarations within the particular code segment; and
 compiling the particular code segment in part by optimizing a second one or more instructions based at least in part on one or more of the known types.

6. The method of claim 5, wherein the one or more instructions are optimized based on the speculative types of the second variables only when a known type for a particular variable of the one or more instructions cannot be utilized for a particular optimization.

7. The method of claim 1, wherein optimizing the one or more instructions includes emitting guard code that checks whether a particular variable of the one or more instructions is a speculative type calculated for the particular variable when assigning the speculative types.

8. A method comprising:
  storing type profiling data for program code, the type profiling data indicating observed types for profiled values within the program code at specific profile points during previous executions of the program code;
  determining to optimize a particular code segment of the program code;
  generating a program representation describing a flow of data through different variables within the particular code segment;
  assigning, in response to said determining to optimize, speculative types to certain variables in the particular code segment by:
    assigning speculative types of first variables to respective observed types recorded in the type profiling data; and
    calculating speculative types of second variables, based at least partially on propagating the speculative types of the first variables through the program representation;
  compiling the particular code segment, at least in part, by optimizing one or more instructions within the particular code segment based at least in part on one or more of the speculative types of variables utilized by the one or more instructions, including at least one of the speculative types of the second variables;
  wherein optimizing the one or more instructions includes:
    emitting guard code that checks whether a particular variable of the one or more instructions is a speculative type calculated for the particular variable when assigning the speculative types;
    performing a determination that optimizing the one or more instructions based on the speculative type for the particular variable outweighs an overhead cost that will be incurred by executing the guard code;
  wherein the method is performed by one or more computing devices.

9. The method of claim 7, further comprising:
  executing the guard code to determine that the particular variable is not the speculative type and in response performing one or more deoptimizations on the one or more instructions.

10. The method of claim 1, wherein propagating the speculative types of the first variables through the program representation is performed by at least determining that a particular variable of the second variables is linked to a first variable in the program representation, and, in response performing at least one of:
  setting a speculative type of the particular variable to a speculative type of the first variable,
  calculating the speculative type of the particular variable based on both the speculative type of the first variable and an observed type recorded for the particular variable in the type profiling data, or
  calculating the speculative type of the particular variable based on a speculative type of a third variable linked to the particular variable in the program representation.

11. The method of claim 1, further comprising:
  identifying a virtual call within the one or more instructions, the virtual call associated with a particular variable of the second variables, wherein the virtual call invokes a particular set of instructions of a plurality of sets of instructions based on a type to which the particular variable conforms;
  generating an optimized version of the one or more instructions by replacing the virtual call with the particular set of instructions of the plurality of sets of instructions that is associated with a speculative type of the particular variable.

12. The method of claim 1, wherein the type profiling data includes, for a particular profile point, a type associated with a variable passed as an argument by the particular profile point or a type associated with a variable returned at the particular profile point.

13. A non-transitory computer-readable storage medium storing a plurality of instructions which, when executed by one or more processors, cause:
  storing type profiling data for program code into a profile that is not created until an invocation of a particular code segment begins or said particular code segment has been repeatedly executed, wherein:
    the type profiling data contains one or more associations, and
    each association of the one or more associations indicates a respective intermediate code instruction and observed types for profiled values accessed by the respective intermediate code instruction during previous executions of the program code, and
    at least one association of the one or more associations indicates: a) an intermediate code instruction that invokes a function, and b) an observed type of a receiver of said function;
  determining to optimize said particular code segment of the program code;
  generating a program representation describing a flow of data through different variables within the particular code segment;
  assigning, in response to said determining to optimize, speculative types to certain variables in the particular code segment by:
    assigning speculative types of first variables to respective observed types recorded in the type profiling data; and
    calculating speculative types of second variables, based at least partially on propagating the speculative types of the first variables through the program representation;
  compiling the particular code segment, at least in part, by optimizing one or more instructions within the particular code segment based at least in part on one or more of the speculative types of variables utilized by the one or more instructions, including at least one of the speculative types of the second variables.

14. The non-transitory computer-readable storage medium of claim 13, wherein the program representation includes one or more of: a control flow graph, a program dependency graph, or one or more data flow equations.

15. The non-transitory computer-readable storage medium of claim 13, wherein the program representation comprises nodes that correspond to the different variables, the nodes being interconnected based on data flow of the program code.

16. The non-transitory computer-readable storage medium of claim 13, wherein determining to optimize the particular code segment is responsive to determining that the particular code segment has been executed in a less optimized form at least a threshold number of times.

17. The non-transitory computer-readable storage medium of claim 13, wherein the plurality of instructions further cause:

assigning known types to one or more of the certain variables within the particular code segment based on type declarations within the particular code segment; and compiling the particular code segment in part by optimizing a second one or more instructions based at least in part on one or more of the known types.

18. The non-transitory computer-readable storage medium of claim 17, wherein the one or more instructions are optimized based on the speculative types of the second variables only when a known type for a particular variable of the one or more instructions cannot be utilized for a particular optimization.

19. The non-transitory computer-readable storage medium of claim 13, wherein optimizing the one or more instructions includes emitting guard code that checks whether a particular variable of the one or more instructions is a speculative type calculated for the particular variable when assigning the speculative types.

20. A non-transitory computer-readable storage medium storing a plurality of instructions which, when executed by one or more processors, cause:

storing type profiling data for program code, the type profiling data indicating observed types for profiled values within the program code at specific profile points during previous executions of the program code;

determining to optimize a particular code segment of the program code;

generating a program representation describing a flow of data through different variables within the particular code segment;

assigning, in response to said determining to optimize, speculative types to certain variables in the particular code segment by:
  assigning speculative types of first variables to respective observed types recorded in the type profiling data; and
  calculating speculative types of second variables, based at least partially on propagating the speculative types of the first variables through the program representation;

compiling the particular code segment, at least in part, by optimizing one or more instructions within the particular code segment based at least in part on one or more of the speculative types of variables utilized by the one or more instructions, including at least one of the speculative types of the second variables;

wherein optimizing the one or more instructions includes:
  emitting guard code that checks whether a particular variable of the one or more instructions is a speculative type calculated for the particular variable when assigning the speculative types;
  performing a determination that optimizing the one or more instructions based on the speculative type for the particular variable outweighs an overhead cost that will be incurred by executing the guard code.

21. The non-transitory computer-readable storage medium of claim 19, wherein the plurality of instructions further cause:

executing the guard code to determine that the particular variable is not the speculative type and in response performing one or more deoptimizations on the one or more instructions.

22. The non-transitory computer-readable storage medium of claim 13, wherein propagating the speculative types of the first variables through the program representation is performed by at least determining that a particular variable of the second variables is linked to a first variable in the program representation, and, in response performing at least one of:

setting a speculative type of the particular variable to a speculative type of the first variable, calculating the speculative type of the particular variable based on both the speculative type of the first variable and an observed type recorded for the particular variable in the type profiling data, or calculating the speculative type of the particular variable based on a speculative type of a third variable linked to the particular variable in the program representation.

23. The non-transitory computer-readable storage medium of claim 13, wherein the plurality of instructions further cause:

identifying a virtual call within the one or more instructions, the virtual call associated with a particular variable of the second variables, wherein the virtual call invokes a particular set of instructions of a plurality of sets of instructions based on a type to which the particular variable conforms;

generating an optimized version of the one or more instructions by replacing the virtual call with the particular set of instructions of the plurality of sets of instructions that is associated with a speculative type of the particular variable.

24. The non-transitory computer-readable storage medium of claim 13, wherein the type profiling data includes, for a particular profile point, a type associated with a variable passed as an argument by the particular profile point or a type associated with a variable returned at the particular profile point.

25. The method of claim 1 wherein at least one association of the one or more associations indicates a respective intermediate code instruction that comprises a typecast.

26. The method of claim 1 wherein each association of the one or more associations contains an intermediate code instruction at a particular offset in an instruction sequence and a set of observed types for profiled values accessed by the intermediate code instruction at the particular offset in a profile array.

* * * * *